United States Patent
Starodoumov et al.

(10) Patent No.: US 9,941,654 B2
(45) Date of Patent: Apr. 10, 2018

(54) FIBER-LASER PUMPED CRYSTAL-LASER

(71) Applicant: Coherent, Inc., Santa Clara, CA (US)

(72) Inventors: Andrei Starodoumov, Campbell, CA (US); Dmitri Simanovski, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 137 days.

(21) Appl. No.: 14/842,058

(22) Filed: Sep. 1, 2015

(65) Prior Publication Data
US 2017/0063018 A1    Mar. 2, 2017

(51) Int. Cl.
| | | |
|---|---|---|
| H01S 3/067 | (2006.01) | |
| H01S 3/16 | (2006.01) | |
| H01S 3/23 | (2006.01) | |
| H01S 3/10 | (2006.01) | |
| H01S 3/11 | (2006.01) | |
| H01S 3/094 | (2006.01) | |
| H01S 3/06 | (2006.01) | |
| H01S 3/08 | (2006.01) | |
| H01S 3/081 | (2006.01) | |

(52) U.S. Cl.
CPC ........ *H01S 3/06716* (2013.01); *H01S 3/0604* (2013.01); *H01S 3/094038* (2013.01); *H01S 3/094042* (2013.01); *H01S 3/094084* (2013.01); *H01S 3/10061* (2013.01); *H01S 3/1106* (2013.01); *H01S 3/165* (2013.01); *H01S 3/1618* (2013.01); *H01S 3/1631* (2013.01); *H01S 3/1643* (2013.01); *H01S 3/1675* (2013.01); *H01S 3/23* (2013.01); *H01S 3/2325* (2013.01); *H01S 3/0621* (2013.01); *H01S 3/0817* (2013.01); *H01S 3/08095* (2013.01)

(58) Field of Classification Search
CPC .. H01S 3/06716; H01S 3/0604; H01S 3/2325; H01S 3/094084; H01S 3/094042; H01S 3/094038; H01S 3/165; H01S 3/1675; H01S 3/1618; H01S 3/23; H01S 3/10061; H01S 3/1643; H01S 3/1631; H01S 3/1106; H01S 3/0817
See application file for complete search history.

(56) References Cited

U.S. PATENT DOCUMENTS

| | | | |
|---|---|---|---|
| 5,917,969 A | * | 6/1999 | Gavrilovic .............. H01S 3/302 372/6 |
| 8,873,136 B2 | | 10/2014 | Starodoumov et al. |
| 2011/0249698 A1 | * | 10/2011 | Hertwig ............ H01S 3/094084 372/70 |

(Continued)

OTHER PUBLICATIONS

Petit et al., "Quest of Athermal Solid State Laser: Case of Yb:CaGdAlO4", Proceedings of the SPIE, vol. 6190, 2006, pp. 619003-1-619003-8.*

(Continued)

*Primary Examiner* — Xinning Niu
(74) *Attorney, Agent, or Firm* — Morrison & Foerster LLP (57) ABSTRACT

An apparatus for generating and amplifying laser beams at approximately 1 micrometer wavelength is disclosed. The apparatus includes an ytterbium-doped gain-crystal pumped by an ytterbium fiber-laser. The fiber-laser enables a pump wavelength to be selected that minimizes heating of the gain-crystal. The apparatus can be configured for generating and amplifying ultra-fast pulses, utilizing the gain-bandwidth of ytterbium-doped gain-crystals.

11 Claims, 7 Drawing Sheets

(56) References Cited

U.S. PATENT DOCUMENTS

2014/0055844 A1    2/2014   Cornier et al.

OTHER PUBLICATIONS

Matsubara et al., "Low Quantum-Detect Laser Oscillation by High Intensity Pumping at Room Temperature", Optical Society of America, 2007, 3 pages.
Petit et al., "Quest of Athermal Solid State Laser: Case of Yb:CaGdAlO4", Optical Society of America, 2005, pp. 1-3.
Sévillano et al., "Pumping Yb-Doped Buik Materials with 976 nm Fiber Lasers", Advanced Solid State Lasers, 2014, 3 pages.
Druon et al., "New Yb-Doped Crystals for High-Power and Uitrashort Lasers", Proceeding of SPIE, vol. 6400, 2006, pp. 64000D-1-64000D-16.
International Search Report and Written Opinion received for PCT Patent Application No. PCT/US2016/046188, dated Nov. 28, 2016, 15 pages.
Machinet et al., "High-Gain Amplification in Yb:CaF2 Crystals Pumped by a High-Brightness Yb-Doped 976 nm Fiber Laser", Applied Physics B, vol. 111, 2013, pp. 495-500.
Petit et al., "Spectroscopy and Tunable Laser Operation of Yb3+:CaF2 Single Crystals", Proceedings of the SPIE, vol. 5460, 2004, pp. 123-131.
Petit et al., "Thermomechanical Properties of Yb3+ Doped Laser Crystals: Experiments and Modeling", Journal of Applied Physics, vol. 108, No. 12, 2010, pp. 123108-1-123108-11.
Yang et al., "Multipass Ti:Sapphire Amplifier based on a Parabolic Mirror", Optics Communications, vol. 234, 2004, pp. 385-390.

* cited by examiner

FIBER-LASER PUMPED CRYSTAL-LASER

TECHNICAL FIELD OF THE INVENTION

The present invention relates in general to generation and amplification of beams of laser-radiation. The invention relates in particular to fiber-laser pumping of lasers and optical amplifiers having crystal gain-elements.

DISCUSSION OF BACKGROUND ART

Laser materials processing has become essential for cutting, drilling, scribing, and ablating a wide range of materials. Progress in scientific research, manufacturing, and medicine is driving laser processing of difficult materials, while demanding higher speed and greater precision.

Ytterbium-doped gain-materials are being developed rapidly by the photonics industry as a means to scale the average powers and pulse energies of laser beams at approximately 1 micrometer (μm) wavelength. Ytterbium ($Yb^{3+}$) is an optically-active ion incorporated into a transparent glass or crystal host to form a gain-material. Such gain-materials are utilized in laser devices to generate and amplify laser beams.

Ytterbium-doped gain-materials belong to a broader class of quasi-three-level laser materials, as known in the art, which are energized through absorption of a pump laser beam with a wavelength shorter than and close to the wavelength of the laser beam to be generated or amplified. The close pump and laser wavelengths mean quasi-three-level gain-materials are absorbing at the laser wavelength. However, when more optically-active ions are energized to a higher laser-state than a lower laser-state, the gain material becomes transparent and has net optical gain at the wavelength of the laser beam.

Laser interactions generate waste heat within a gain-material. Heating produces thermal gradients in a gain-material that modify the optical refractive index and create a thermal lens. At low pump powers, the thermal lens can be accommodated in the optical design of a laser device. At high pump powers, the thermal lens has aberrations that cannot be compensated and that limit power scaling of a laser device. A benefit of the close pump and laser wavelengths in a quasi-three-level laser is to minimize generation of waste heat. A disadvantage of a quasi-three-level laser is that an intense pump beam is necessary to induce transparency and achieve optical gain.

Prior-art devices can be divided broadly into four architectures, wherein the gain-material is in the form of an optical fiber, a rod, a slab, or a thin-disk. A typical laser device would use one or more commercially available diode-lasers as a source for the pump laser beam. By way of example, ytterbium in host crystal YAG ($Y_3Al_5O_{12}$) is usually pumped by a diode-laser beam at either 940 or 969 nanometers to exploit strong absorption peaks of ytterbium in YAG.

For high pump powers, diode-lasers are cost effective, but have poor beam-quality, which means the pump beam must be tightly focused to achieve transparency and optical gain. Tight focusing can only be maintained over a short length of the gain-material due to diffraction. Diode-laser pumped optical fibers maintain high pump-beam intensity over long lengths by guiding the pump and laser beams within a small cladding and core. Fiber lasers with high average power have been demonstrated, but pulse energy is limited by non-linear processes enhanced by confining high-power beams to a small guiding core.

Thin-disk lasers mitigate the thermal lens by efficient cooling through the back face of a gain-material having the form of a disk that is much thinner than the diameter of the pump beam. However, the pump beam is weakly absorbed by such a disk, being less than approximately 500 micrometers thick. The diode-laser must be maintained at a peak absorption wavelength of the gain-material and complex apparatus is necessary to cycle a focused pump beam through the thin disk a sufficient plurality of times to absorb most of the pump beam. Gain for each pass of the laser beam through the thin disk is low, so it is essential to minimize all losses in the laser device. Slab lasers also have large surface areas for efficient cooling, but designs for efficient quasi-three-level slab lasers having beam-quality that matches that of rod lasers have proved elusive and expensive.

There is need for less-complex and less-expensive apparatus for generating and amplifying laser beams with good beam-quality. Preferably, the apparatus would be scalable to both high average power and high pulse energy, utilizing a gain-material having sufficient bandwidth to support ultra-fast pulses. High average-power and high pulse-energy enable high-speed material processing, while good beam-quality and ultra-fast pulses enable precision.

SUMMARY OF THE INVENTION

In one aspect, optical apparatus in accordance with the present invention comprises an ytterbium-doped gain-crystal to amplify a beam of laser-radiation at a signal-wavelength. The gain-crystal has an emission-wavelength about equal to the signal-wavelength. An ytterbium fiber-laser delivers a beam of laser-radiation at a pump-wavelength that is shorter than the signal-wavelength. The pump-wavelength beam and signal-wavelength beam are arranged to propagate collinearly through an optical system. The optical system receives the collinear beams and causes the collinear beams to make a predetermined plurality of focused interactions at a common location in the gain-crystal. The pump-wavelength beam energizes the gain-crystal and the energized gain-crystal amplifies the signal-wavelength beam. The optical system delivers the amplified signal-wavelength beam from the apparatus. The pump-wavelength and signal-wavelength determine a quantum-defect of the amplifier apparatus, the quantum-defect being less than about 4.5%.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
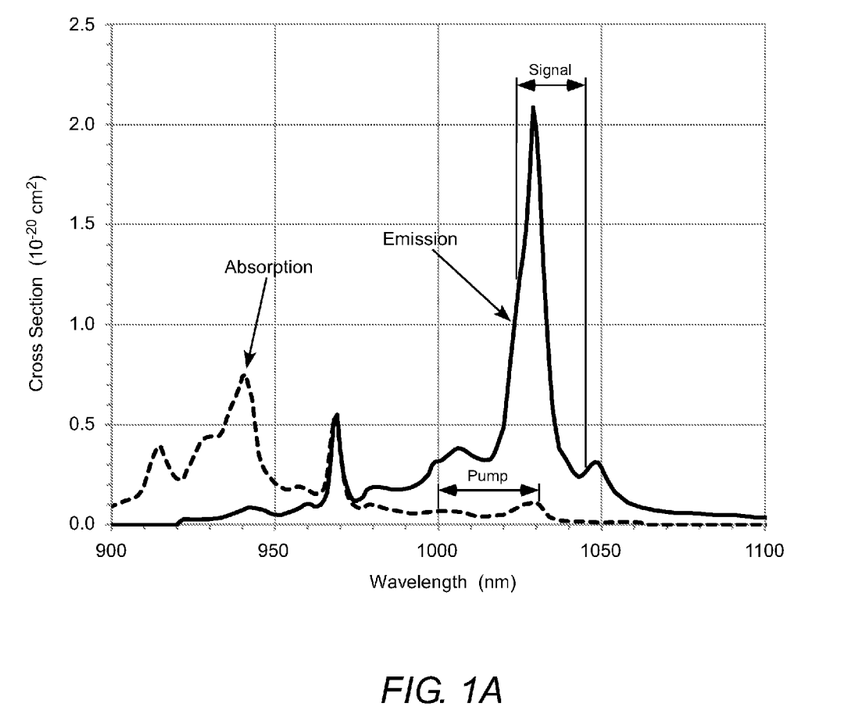
FIG. 1A is a graph schematically illustrating signal-wavelength and pump-wavelength, relative to absorption and emission spectra of 1 atomic-percent ytterbium ($Yb^{3+}$) in YAG ($Y_3Al_5O_{12}$) crystal.
Figure 1B:
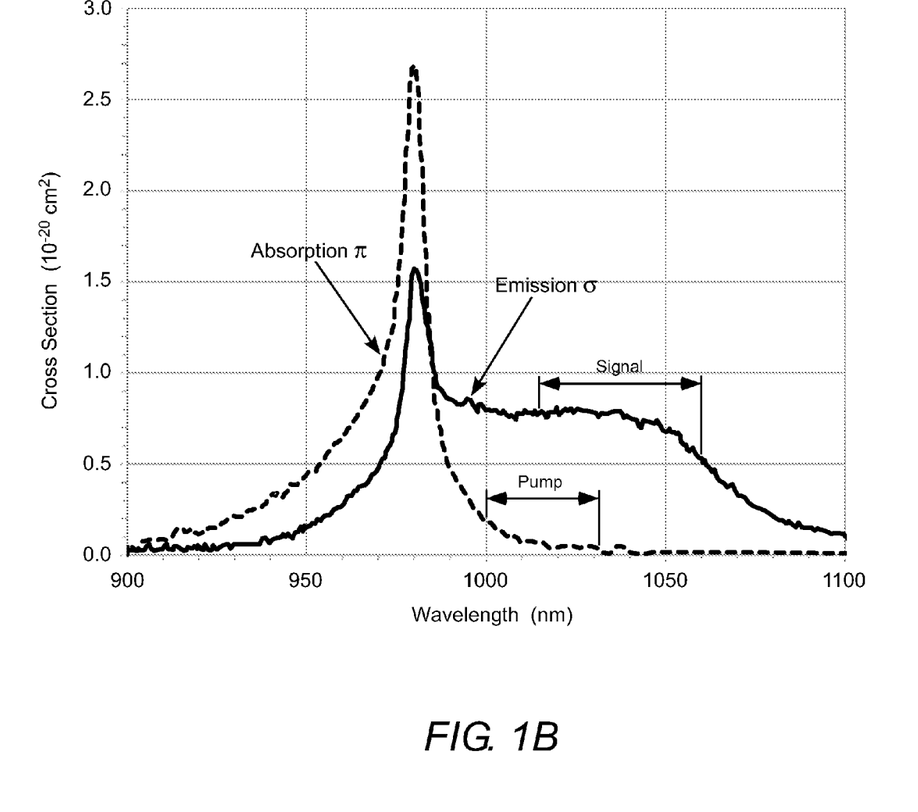
FIG. 1B is a graph schematically illustrating signal-wavelength and pump-wavelength, relative to pi-polarized absorption and sigma-polarized emission spectra of 2-atomic percent ytterbium ($Yb^{3+}$) in CALGO ($CaAlGdO_4$) crystal.

Referring now to the drawings, wherein like components are designated by like reference numerals, FIG. 1A and FIG. 1B schematically illustrate optical interactions in accordance with the present invention with an ytterbium-doped gain-crystal. The gain-crystal interacts with radiation at a pump-wavelength (Pump) that is absorbed by the gain-crystal and radiation at a signal-wavelength (Signal) that is emitted by the gain-crystal. Pump-wavelength radiation energizes the gain-crystal. The energized gain-crystal amplifies signal-wavelength radiation. A quantum-defect is defined, here, as the difference between the pump-wavelength and signal-wavelength, divided by the signal-wavelength, and expressed as a percentage. The pump- and signal-wavelengths are selected such that the quantum-defect is preferably less than 5.0% and more preferably less than 4.5%.

FIG. 1A depicts absorption and emission spectra of ytterbium ions ($Yb^{3+}$) at 1 atomic-percent concentration in YAG (yttrium aluminum garnet or $Y_3Al_5O_{12}$). The signal-wavelength is preferably between about 1023 nanometers (nm) and about 1055 nm. The pump-wavelength is selected to make the quantum-defect less than 4.5%, and is preferably between about 1000 nm and about 1031 nm.

FIG. 1B depicts absorption and emission spectra of ytterbium ions ($Yb^{3+}$) at 2 atomic-percent concentration in CALGO ($CaAlGdO_4$). The signal wavelength is preferably between about 1015 nm and about 1060 nm. Here again, the pump-wavelength is selected to make the quantum-defect less than 4.5%, and is preferably between about 1000 nm and 1032 nm.

Another example of an ytterbium-doped gain-crystal is ytterbium-doped calcium fluoride ($CaF_2$). The signal wavelength for this gain-crystal is preferably between about 1015 nm and 1060 nm. The pump-wavelength is preferably between about 1000 nm and 1030 nm. Yet another example of an ytterbium-doped gain-crystal is ytterbium-doped KGW ($KGd[WO_4]_2$). The signal wavelength for this gain-crystal is preferably between about 1022 nm and 1035 nm. The pump-wavelength is preferably between about 1000 nm and 1022 nm. Ytterbium-doped YAG, calcium fluoride, CALGO, and KGW crystals all have emission bandwidths large enough to amplify mode-locked pulses of 1 picosecond duration.

For each example of a gain-crystal above, the preferred signal-wavelength is within a range of comparatively-high emission cross-section and therefore there is high gain at the signal-wavelength. The preferred pump-wavelength minimizes the quantum-defect and therefore minimizes heating of the gain-crystal, while the pump-wavelength beam is still absorbed by the gain-crystal. Excessive heating of the gain-crystal causes detrimental aberration of the signal-wavelength beam.

Figure 2:
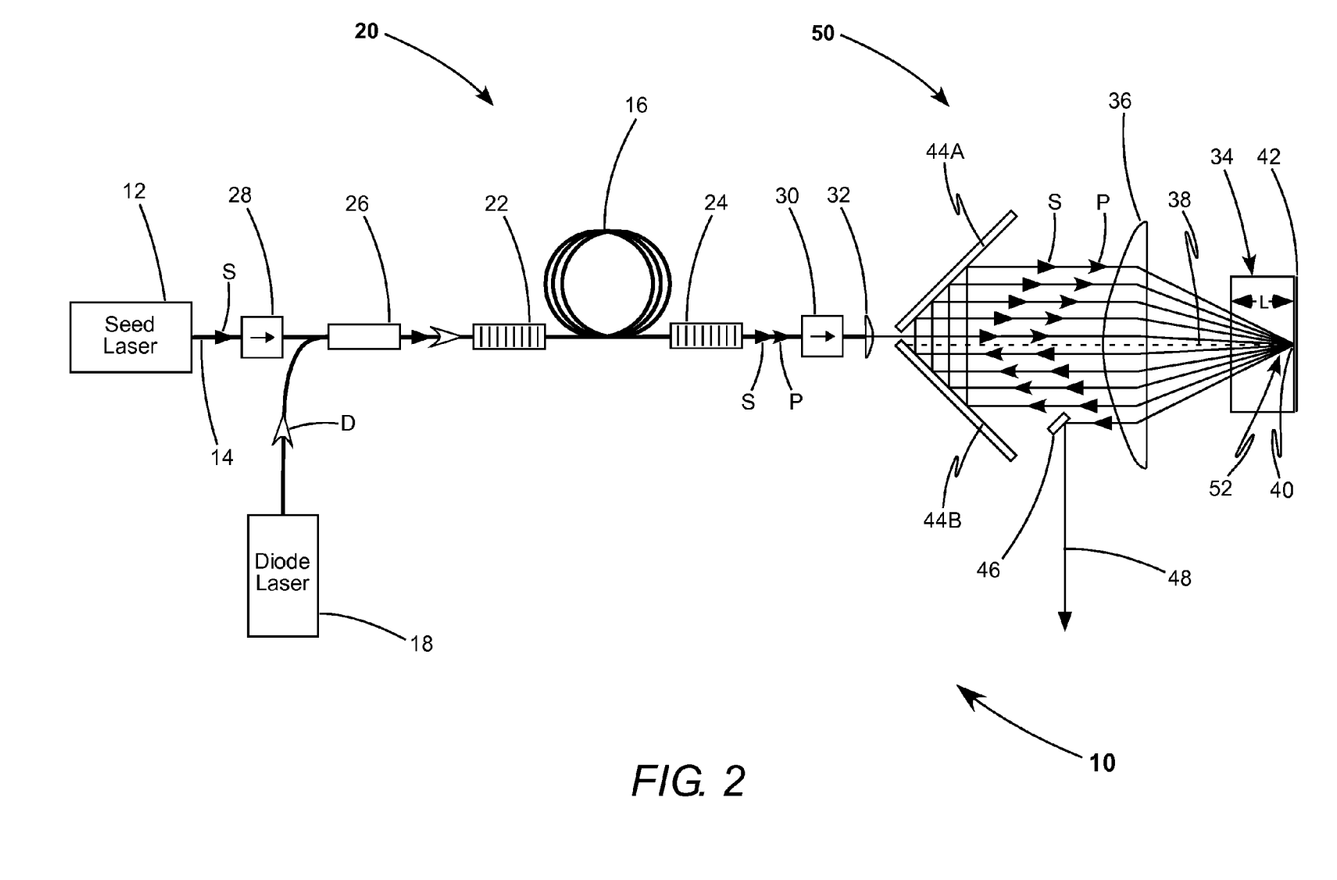
FIG. 2 schematically illustrates one preferred embodiment of optical amplifier apparatus in accordance with the present invention including a source of signal-wavelength radiation to be amplified, an ytterbium fiber-laser for delivering pump-wavelength radiation that is collinearly combined with the signal-wavelength radiation by passage through the fiber-laser, an ytterbium-doped gain-crystal, and an optical system for causing a plurality of focused interactions of the collinearly propagating pump-wavelength and signal-wavelength radiation in the gain-crystal.

FIG. 2 schematically illustrates one preferred embodiment 10 of amplifying apparatus in accordance with the present invention. Apparatus 10 includes a source of laser-radiation 12 (Seed Laser) that delivers a beam of laser-radiation at the signal-wavelength (S) through an optical fiber 14. The signal-wavelength beam is either a continuous-wave beam or a pulsed beam.

Apparatus 10 includes a fiber-laser 20. Fiber laser 20 includes an optical gain-fiber 16 having an ytterbium-doped core and a diode laser 18 (Diode Laser) delivering a beam of laser-radiation at a diode-wavelength (D). A first fiber-Bragg-grating (FBG) 22 is highly reflective for the pump-wavelength (Pump), and a second FBG 24 is partially reflective and partially transmissive for the pump-wavelength (Pump). Both the first and second FBGs are transmissive for the signal-wavelength. The diode-wavelength beam energizes the gain-fiber. The energized gain-fiber and the two FBGs generate a beam of laser-radiation at the pump-wavelength (P).

Apparatus 10 further includes a fiber signal-pump combiner 26 for injecting both the signal-wavelength and diode-wavelength beams into gain-fiber 16. The pump-wavelength beam generated by the fiber-laser and the signal-wavelength beam from source 12, being close in wavelength, are both guided in the gain-fiber.

In the representation of FIG. 2, apparatus 10 optionally includes a first optical isolator 28 protecting signal-source 12 and a second optical isolator 30 protecting the fiber-laser. Propagation in optical-fiber is indicated by bold lines and propagation in free-space by fine lines. Apparatus 10 includes a fiber-collimator 32 transferring the signal-wavelength and pump-wavelength beams from optical-fiber propagation to free-space propagation. The signal-wavelength and pump-wavelength beams propagate collinearly from the fiber-collimator and are directed into an optical system 50 that is arranged around the ytterbium-doped gain-crystal 34.

Optical system 50 includes a lens 36 having a principal axis 38 parallel to and spaced apart from the incident collinear pump-wavelength and signal-wavelength beams and is arranged to focus the incident collinear beams to a common location 40 in the ytterbium-doped gain-crystal. A back-surface mirror 42 reflects the collinear beams. The spatial separation between the incident collinear beams and principal axis 38 of the lens 36 causes the incident and reflected collinear beams to follow different paths through optical system. Reflecting (mirrored) surfaces 44A and 44B are arranged to intercept the reflected collinear beams and direct the intercepted collinear beams on a new path through the lens and to focus again at the common-location in the gain crystal. The collinear beams make a predetermined plurality of such passes through the optical system and corresponding interactions with the gain-crystal.

Each predetermined pass through optical system 50 and each interaction with gain-crystal 34 corresponds to a double pass through the gain-crystal. The absorbed pump-wavelength beam energizes the gain crystal and the energized gain-crystal amplifies the signal beam. The optical system further includes a mirror 46 to direct the amplified signal-wavelength beam 48 out of the amplifying apparatus. The distance of mirror 46 from axis 38 determines the number of interaction of the collinear pump-wavelength and signal-wavelength beams with gain-crystal 34.

In the representation of FIG. 2, reflecting surfaces 44A and 44B are depicted as stand-alone mirrors. Those skilled in optical design would recognize that surfaces 44A and 44B could equally well, for the purposes of the description and the claims appended hereto, be surfaces of at least one prism.

The signal-wavelength and pump-wavelength beams interact within a common volume 52 inside the gain-crystal. In order amplify the signal-wavelength beam, it is necessary to energize sufficient ytterbium ions in the common volume to achieve transparency and gain. Single-pass gain through the gain-crystal is maximized by maximizing absorption of the pump-wavelength beam in common volume 52, minimizing common volume 52, and minimizing the length of the crystal (L).

High-brightness and good beam-quality are features of fiber-laser 20 that enable the pump-wavelength beam to be focused tightly to create a small common volume. The multi-pass arrangement of optical system 50 allows for a shorter gain-crystal than an equivalent single-pass arrangement having the same interaction length for the optical beams. The number of passes and the thickness of the gain-crystal are determined such that the gain-crystal absorbs most of the power in the pump-wavelength beam, with a residual fraction of unabsorbed power, sufficient to induce transparency. A multi-pass arrangement with at least 4 predetermined passes (interactions) is preferred.

By way of example, 5 atomic-percent ytterbium-doped YAG with a pump-wavelength of 1010 nm and a signal-wavelength of 1030 nm has a quantum-defect of approximately 2%. A total interaction length of approximately 100 millimeters (mm) is required to absorb 94% of the pump-wavelength beam. At a pump power of approximately 50 Watts, a focused pump-wavelength beam-diameter of approximately 80 micrometers (μm) is sufficient to achieve gain. However, 50 mm from such a focus, the beam-diameter expands to more than 450 μm due to diffraction. Only a short section near the focus in a 100 mm gain-crystal would cause gain in a single-pass arrangement. An equivalent multi-pass arrangement has 5 predetermined passes and a 10 mm long gain-crystal. If the pump-wavelength beam from the fiber-laser is focused at the back surface of the gain-crystal with a focused beam-diameter of 80 μm, the beam diameter at the front surface would be 120 μm. The signal-wavelength gain would be approximately 6.8 decibels for each double pass through gain crystal 34.

Figure 3:
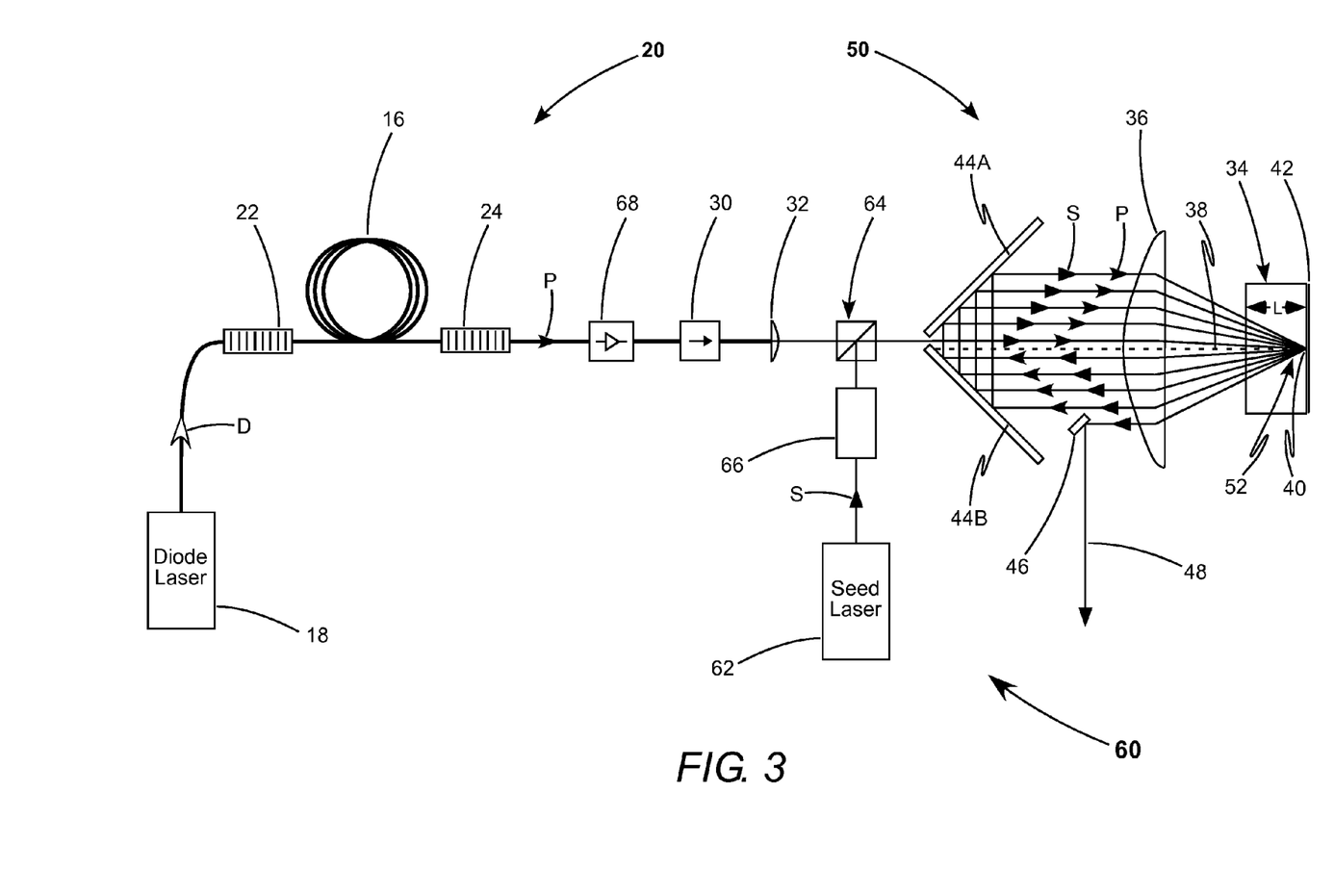
FIG. 3 schematically illustrates another preferred embodiment of optical amplifier apparatus in accordance with the present invention, similar to the embodiment of FIG. 2, but wherein the signal-wavelength radiation is collinearly combined in free-space with the pump-wavelength radiation from the ytterbium fiber-laser.

FIG. 3 schematically illustrates another preferred embodiment 60 of amplifier apparatus in accordance with the present invention. Apparatus 60 is similar to apparatus 10 of FIG. 2, with an exception that the signal-wavelength-beam is combined with the pump-wavelength beam in free-space instead of in gain-fiber 16 of fiber-laser 20. Apparatus 60 includes a source of laser-radiation 62 (Seed Laser) that delivers an approximately-collimated beam of laser-radiation at the signal-wavelength, and a beam-combiner 64 to combine the approximately-collimated signal-wavelength and pump-wavelength beams. An optional telescope 66 may be used to set the diameter of the approximately-collimated signal-wavelength beam. The combined single-wavelength and pump-wavelength beams propagate collinearly through optical system 50, as discussed above, and the signal-wavelength beam is amplified. In the representation of FIG. 3, apparatus 60 includes at least one optional fiber-preamplifier 68 to amplify the pump-wavelength beam generated by the fiber-laser.

In the representation of FIG. 3, beam-combiner 64 is depicted as a polarization-selective beam combiner. Those skilled in the art of optical design would recognize that a wavelength-selective beam-combiner having thin-film dielectric coatings could be used as an alternative to a polarization-selective beam-combiner for the signal-wavelength and pump-wavelength beams, without departing from the spirit and scope of the present invention.

Figure 4:
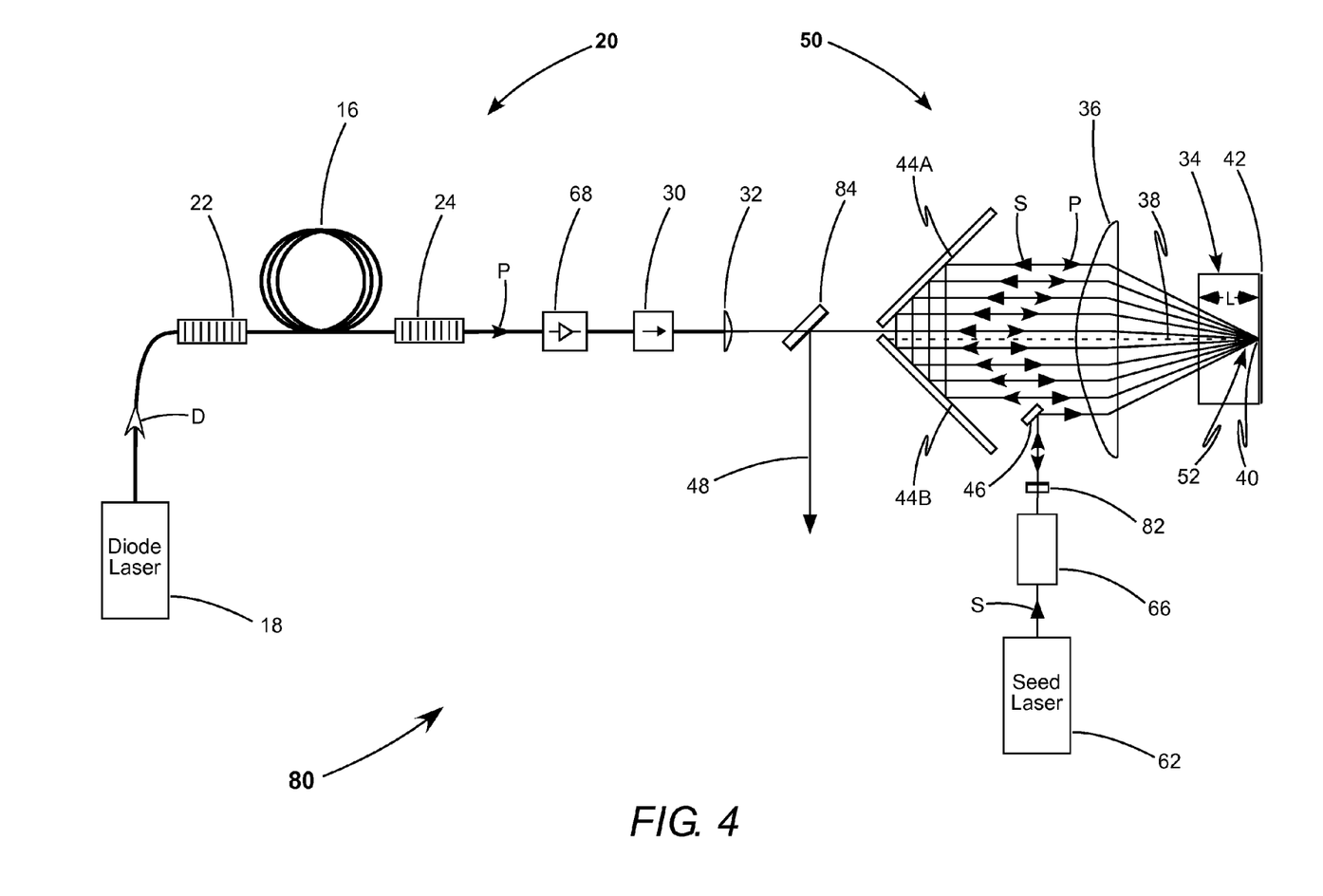
FIG. 4 schematically illustrates yet another preferred embodiment of optical amplifier apparatus in accordance with the present invention, similar to the embodiment of FIG. 3, but wherein the signal-wavelength radiation counter-propagates collinearly with the pump-wavelength radiation through the optical system.

FIG. 4 schematically illustrates yet another preferred embodiment 80 of amplifier apparatus in accordance with the present invention. Apparatus 80 is similar to apparatus 60 of FIG. 3, with an exception that the collinear single-wavelength and pump-wavelength beams counter-propagate through optical system 50. Apparatus 80 includes a mirror 82 that is transmissive for the signal wavelength and a mirror 84 that is reflective for the signal wavelength. Mirror 46 and mirror 82 are reflective for the pump wavelength and mirror 84 is transmissive for the pump wavelength. The approximately-collimated beam of laser-radiation at the signal-wavelength from seed laser 62 is delivered to optical system 50 through mirror 82. The signal-wavelength beam is arranged to be collinear with the residual unabsorbed pump-wavelength beam transmitted through optical system 50. The signal-wavelength beam, collinear and counter-propagating with the pump-wavelength beam through optical system 50, is amplified. Amplified signal-wavelength beam 48 is directed out of the amplifying apparatus by mirror 84.

In the representation of FIG. 4, the residual pump-wavelength beam after a first complete pass through optical system 50 is reflected by mirror 82 back into optical system 50 to be absorbed by gain crystal 34, thereby improving the efficiency of the amplifier. Mirror 82 is aligned such that the reflected residual pump-wavelength beam propagates collinearly with the signal-wavelength beam.

Figure 5:
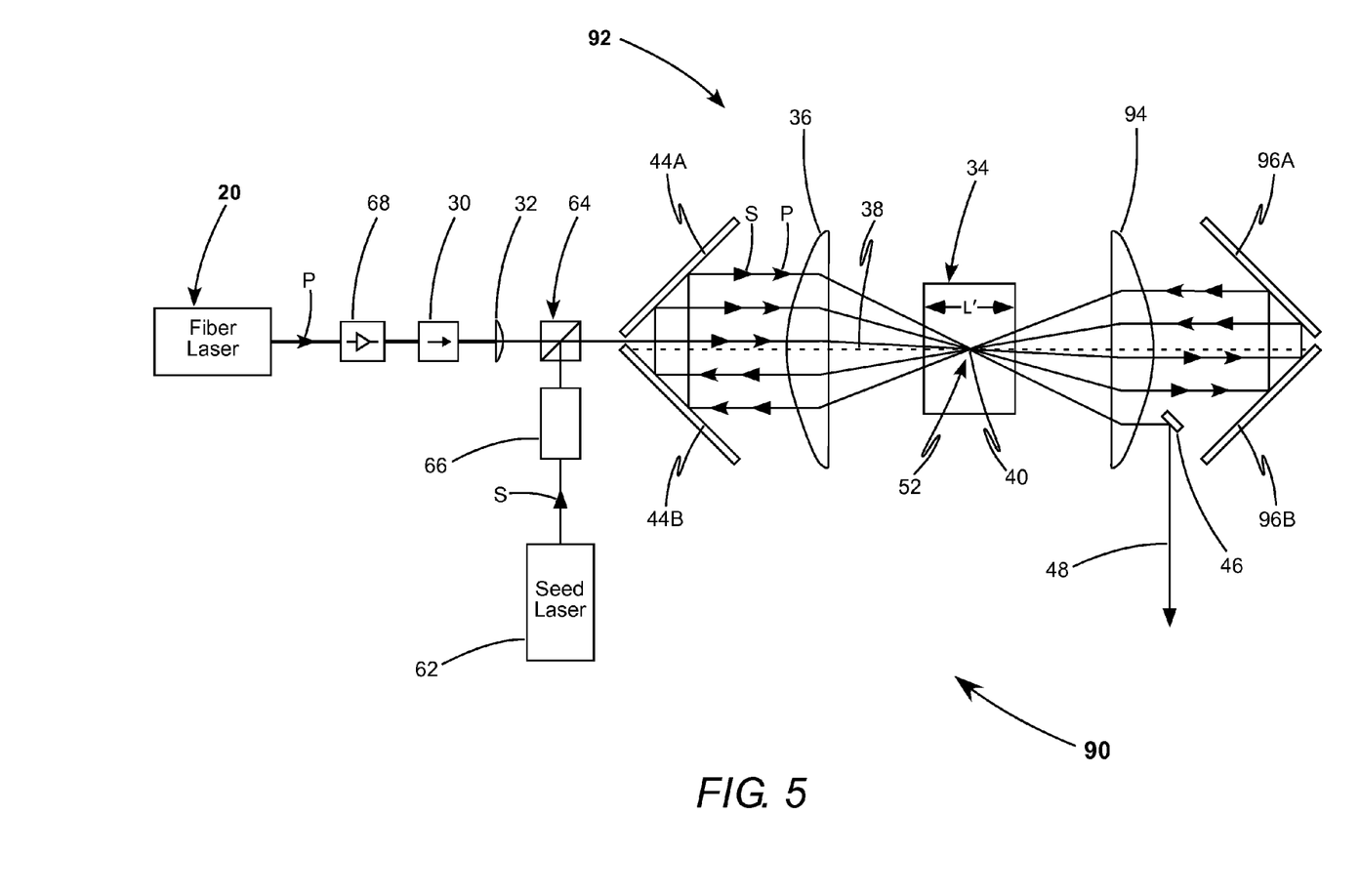
FIG. 5 schematically illustrates still another preferred embodiment of optical amplifier apparatus in accordance with the present invention, similar to the embodiment of FIG. 3, but wherein the collinear signal-wavelength and pump-wavelength radiation is focused to a common location that is spaced from the surfaces of the gain-crystal.

FIG. 5 represents still another preferred embodiment 90 of amplifier apparatus in accordance with the present invention. Apparatus 90 is similar to apparatus 60 of FIG. 3, with the exception that common location 40 is both inside of and spaced from surfaces of ytterbium-doped gain-crystal 34. A modified optical system 92 includes the elements of optical system 50, a second lens 94, and reflecting surfaces 96A and 96B. However, optical system 92 does not include back-surface mirror 42. Optical system 92 is arranged to focus the collinear signal-wavelength and pump-wavelength beams to common location 40 inside the gain crystal. The collinear beams make a predetermined plurality of passes through the optical system. Here, each predetermined pass through optical system 92 and each interaction with gain-crystal 34 corresponds to a single pass through the gain-crystal.

Focusing the collinear beams close to the surface of the gain crystal can limit the potential power and pulse-energy of the amplified signal-wavelength beam, due to laser-induced damage. For apparatus 90, power and pulse-energy would be limited by laser-damage thresholds of the bulk gain-material, which are generally much higher than laser-damage thresholds for surfaces of either the gain-material or a mirror. The length of the gain-crystal (L') in apparatus 90 could be made approximately twice the length L of the gain-crystal in apparatus 60, to achieve an equivalent interaction length for the optical beams. A crystal length of 2 L also ensures the intensities of the collinear beams on the gain-crystal surfaces are no higher in apparatus 90 than in apparatus 60, under equivalent conditions of power and gain.

Figure 6:
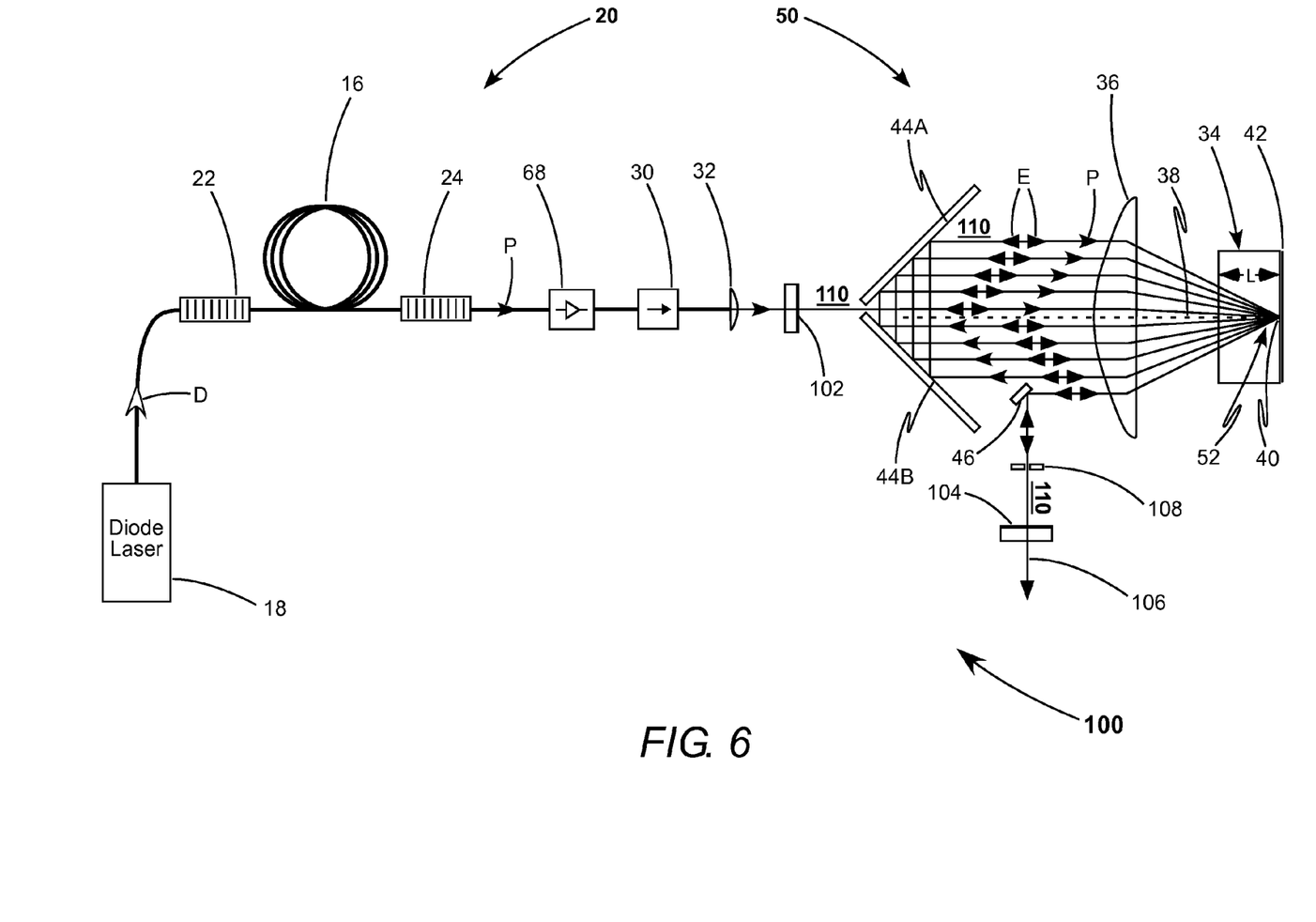
FIG. 6 schematically illustrates one preferred embodiment of laser apparatus in accordance with the present invention, including an ytterbium fiber-laser for delivering pump-wavelength radiation, an ytterbium-doped gain-crystal having an emission wavelength, a laser-resonator formed between two end-mirrors and including an optical system for causing a plurality of focused interactions of the pump-wavelength wavelength radiation in the gain-crystal for generating laser radiation at the emission-wavelength, the pump-wavelength and emission wavelength radiation propagating collinearly in the laser-resonator.

FIG. 6 schematically illustrates a preferred embodiment 100 of laser apparatus in accordance with the present invention. Apparatus 100 is similar to apparatus 10 and apparatus 60, with an exception that apparatus 100 generates rather than amplifies a beam of laser radiation. Apparatus 100 includes fiber laser 20, here, configured as depicted in FIG. 3.

Apparatus 100 includes a laser resonator 110, formed between end-mirrors 102 and 104. Laser resonator 110 further includes gain-crystal 34 and optical system 50, described above with reference to FIGS. 2 and 3. Here, end-mirror 102 is highly reflective at an emission-wavelength of the gain-crystal. End-mirror 104 is partially transmissive and partially reflective at the emission-wavelength.

Mirror 102 is arranged to receive the pump-wavelength beam from fiber-laser 20 and transmit the pump-wavelength beam into multi-pass system 50. Multi-pass system 50 includes lens 36, back-surface mirror 42, reflecting surfaces 44A and 44B, and mirror 46, as described above with reference to FIGS. 2 and 3.

Multi-pass system 50 causes the pump-wavelength beam to follow a serpentine path through the lens, making a predetermined plurality of focused interactions with the gain-crystal, thereby energizing the gain-crystal. End-mirror 104 is arranged to intercept the serpentine path to form laser-resonator 110. Laser-resonator 110 generates a beam of laser-radiation at the emission-wavelength (E). The pump-wavelength and emission-wavelength beams propagate collinearly in the laser resonator.

In the representation of FIG. 6, mirror 46 is located in the serpentine path of the laser-resonator and directs the emission-beam out of multi-pass system 50 and to second mirror 104. An output beam of laser-radiation at the emission-wavelength 106 is transmitted through the second mirror. Alternatively, second mirror 104 could be located in the serpentine path between lens 36 and mirror 46. Mirror 46 would then direct output-beam 106 out of multi-pass system. In general, laser resonator 110 can be considered as a "folded" resonator, with reflecting surfaces 44A and 44B, and mirrors 42 and 46 of optical system 50 functioning as fold-mirrors of the laser-resonator.

In steady state operation of laser-resonator 110, the emission-wavelength beam circulates continuously between the end mirrors, with gain and losses in balance. The emission-wavelength beam has two interactions with the gain-crystal for each round trip in the laser-resonator. The main loss to the emission-wavelength beam is through the partially-transmissive end-mirror 104, which partially reflects the emission-wavelength beam once each round trip.

The emission-wavelength and output beams can be either continuous-wave or pulsed. A pulsed beam can be generated by means that could include soft-aperture Kerr-lens mode-locking, hard-aperture Kerr-lens mode-locking and passive mode-locking, as known in the art. By way of example, in the representation of FIG. 6, an additional aperture 108 located close to second-mirror 104 would enable hard-aperture mode-locking of the laser-resonator.

While ytterbium ($Yb^{3+}$) has been exemplified as a dopant ion in the amplifier and laser apparatus described above, other dopant ions that facilitate a small quantum-defect may be selected without departing from the spirit and scope of the present invention. These include, but are not limited to, holmium ($Ho^{3+}$), erbium ($Er^{3+}$), and thulium ($Tm^{3+}$).

In summary, a signal-wavelength beam can be efficiently amplified in a gain-crystal that is excited at a pump-wavelength selected for a small quantum-defect. The embodiments described above amplify a signal-wavelength beam having a wavelength of approximately 1 μm using a pump-wavelength beam delivered by an ytterbium fiber-laser, and an ytterbium-doped gain-crystal arranged in a multi-pass optical system. Mode-locked pulses at approximately 1 μm wavelength can be generated using a fiber-laser, and a gain-crystal in a multi-pass optical system arranged as a laser resonator operating at an emission-wavelength of the gain-crystal. A high-brightness pump-wavelength beam and a multi-pass optical system overcome the low absorption cross-section encountered when targeting both high gain at the emission-wavelength and a small quantum-defect.

The present invention is described above in terms of a preferred embodiment and other embodiments. The invention is not limited, however, to the embodiments described and depicted herein. Rather, the invention is limited only by the claims appended hereto.

What is claimed is:

1. Optical apparatus comprising:
   a light source for generating a pulsed laser beam, the pulsed laser beam having a signal-wavelength;
   an ytterbium-doped gain-crystal having an emission wavelength about equal to the signal-wavelength, said ytterbium-doped gain-crystal for amplifying the pulsed laser beam;
   an ytterbium fiber-laser delivering a beam of laser-radiation at a pump-wavelength between 1000 nm and 1032 nm, the pump-wavelength being shorter than the signal-wavelength, the pump-wavelength beam and the signal-wavelength beam arranged to propagate collinearly;
   an optical system including at least one focusing element and at least one reflective element, the optical system arranged to receive the collinear pump-wavelength and the signal-wavelength beams, focus the collinear pump-wavelength and signal-wavelength beams at a common location in the gain-crystal, cause the collinear pump-wavelength and the signal-wavelength beams to make a predetermined plurality of focused interactions with the gain-crystal at the common location for amplifying the signal-wavelength beam, and deliver the amplified signal-wavelength beam from the apparatus; and
   wherein the amplifier apparatus has a quantum-defect less than about 4.5%, wherein the quantum-defect is defined as being the difference between the pump-wavelength and the signal-wavelength divided by the signal-wavelength.

2. The apparatus of claim 1, wherein the signal-wavelength beam is delivered from a source thereof through the fiber-laser, and exits the fiber-laser collinear with the pump-wavelength beam.

3. The apparatus of claim 1, wherein the pump-wavelength beam from the fiber laser and the signal-wavelength beam are combined collinearly by a beam-combiner.

4. The apparatus of claim 3, wherein the beam-combiner is a polarization-selective beam-combiner.

5. The apparatus of claim 1, wherein the pump-wavelength beam from the fiber laser and the signal-wavelength beam are arranged to counter-propagate collinearly through the optical system.

6. The apparatus of claim 1, wherein the pump-wavelength beam after a first complete pass through the optical system is reflected back into the optical system, collinear with the signal-wavelength beam.

7. The apparatus of claim 1, wherein the common location is inside the gain-crystal and spaced from surfaces of the gain-crystal.

8. The apparatus of claim 1, wherein the common location is adjacent a first surface of the gain-crystal opposite a second surface of the gain-crystal where the pump-wavelength and the signal-wavelength beams first enter the crystal and wherein the first surface of the gain-crystal includes a coating reflective for the pump-wavelength and the signal-wavelength beams.

9. The apparatus of claim 1, wherein the ytterbium-doped gain-crystal is a crystal of a material selected from the group of materials consisting of YAG, calcium fluoride, CALGO, and KGW.

10. Optical apparatus comprising:
a light source for generating a pulsed laser beam, the pulsed laser beam having a signal-wavelength;
a ytterbium doped gain-crystal, the gain-crystal having an emission wavelength about equal to the signal-wavelength, the gain-crystal having an absorption wavelength about equal to a pump-wavelength, the signal-wavelength being longer than the pump-wavelength, the gain-crystal having a quantum-defect less than about 4.5%, wherein the quantum-defect is defined as the difference between the pump-wavelength and the signal-wavelength divided by the signal-wavelength, the gain crystal for amplifying the pulsed laser beam;
a pump laser delivering a beam of laser radiation at the pump-wavelength between 1000 nm and 1032 nm, the pump-wavelength beam and the signal-wavelength beam arranged to propagate collinearly; and
an optical system including at least one focusing element and at least one reflective element, the optical system arranged to receive the collinear pump-wavelength and signal-wavelength beams, focus the collinear pump-wavelength and signal-wavelength beams to a common location in the gain-crystal, and cause the collinear pump-wavelength and signal-wavelength beams to make a predetermined plurality of focused interactions within the gain-crystal, for energizing the gain-crystal and amplifying the focused signal-beam, the optical system arranged to deliver the amplified signal-wavelength beam from the apparatus.

11. The apparatus of claim 10, wherein the host material is YAG.

* * * * *